United States Patent
Ritzinger et al.

(10) Patent No.: US 8,310,090 B2
(45) Date of Patent: Nov. 13, 2012

(54) DIFFERENTIAL-CURRENT SWITCH

(75) Inventors: Georg Ritzinger, Wolfpassing (AT);
Rainer Meisel, Vienna (AT)

(73) Assignee: Moeller Gebäudeautomation GmbH,
Schrems (AT)

( * ) Notice: Subject to any disclaimer, the term of this patent is extended or adjusted under 35 U.S.C. 154(b) by 217 days.

(21) Appl. No.: 12/618,112

(22) Filed: Nov. 13, 2009

(65) Prior Publication Data
US 2010/0118450 A1     May 13, 2010

Related U.S. Application Data

(60) Provisional application No. 61/114,114, filed on Nov. 13, 2008.

(30) Foreign Application Priority Data

Nov. 13, 2008  (AT) ................................ A 176320/08

(51) Int. Cl.
*H02J 1/00*      (2006.01)
(52) U.S. Cl. ................ 307/30; 361/42; 361/43; 361/47; 361/93.1; 361/91.1
(58) Field of Classification Search ............ 307/30; 361/42–43, 47, 93.1
See application file for complete search history.

(56) References Cited

U.S. PATENT DOCUMENTS

| | | | |
|---|---|---|---|
| 5,066,920 A * | 11/1991 | Suptitz .......................... | 324/544 |
| 5,371,646 A * | 12/1994 | Biegelmeier .................... | 361/47 |
| 6,097,580 A | 8/2000 | Zaretsky | |
| 6,268,987 B1 * | 7/2001 | Sundermann ................... | 361/42 |
| 6,697,244 B1 * | 2/2004 | Bauer et al. .................. | 361/93.1 |
| 2007/0247773 A1 * | 10/2007 | Bartonek et al. ............. | 361/91.1 |

FOREIGN PATENT DOCUMENTS

| | | |
|---|---|---|
| DE | 102007007263 | 8/2007 |
| EP | 0 399 923 A1 | 11/1990 |
| EP | 0 936 716 A1 | 8/1999 |
| EP | 1 478 069 A1 | 11/2004 |

* cited by examiner

*Primary Examiner* — Jared Fureman
*Assistant Examiner* — Alfonso Perez Borroto
(74) *Attorney, Agent, or Firm* — Henry M. Feiereisen, LLC

(57) ABSTRACT

A differential-current switch includes a first unit arranged in an electric power supply network for detecting a differential current and outputting an analog differential current signal, an analog-to-digital converter receiving the outputted analog differential current signal and converting the outputted analog differential current signal to a digital differential current signal, a first digital signal processing unit receiving the digital differential current signal, a second unit for disconnecting circuit breaker contacts in the electric power supply network, and first means connected upstream of the analog-to-digital converter for adjusting the analog differential current signal. Adjustment of the analog differential current signal provides favorable resolution of a differential current signal over a wide dynamic range.

15 Claims, 3 Drawing Sheets

DIFFERENTIAL-CURRENT SWITCH

CROSS-REFERENCES TO RELATED APPLICATIONS

This application claims the benefit of prior filed U.S. provisional Application No. 61/114,114, filed Nov. 13, 2008, pursuant to 35 U.S.C. 119(e), the content of which is incorporated herein by reference in its entirety as if fully set forth herein.

This application also claims the priority of Austrian Patent Application, Serial No. A 1763/2008, filed Nov. 13, 2008, pursuant to 35 U.S.C. 119(a)-(d), the content of which is incorporated herein by reference in its entirety as if fully set forth herein.

BACKGROUND OF THE INVENTION

The present invention relates to a differential-current switch.

The following discussion of related art is provided to assist the reader in understanding the advantages of the invention, and is not to be construed as an admission that this related art is prior art to this invention.

Differential-current switches are known in which a differential current which is determined or detected is digitized by means of an analog-to-digital converter, and is further processed and evaluated by means of digital signal processing. The disadvantageous aspect in such differential-current switches is that they resolve the occurring differential currents only insufficiently, at least in the actually implemented configurations. A resolution of 100 µA is necessary at a nominal differential current of 30 mA. With the currently used analog-to-digital converters which have a resolution of 10 bits or 12 bits, such a fine resolution is only possible at a considerable limitation of the maximum resolvable differential current, which is why overdriving (clipping) occurs at high differential currents.

Differential-current switches are also known which in addition to an line-voltage-independent electronic trigger system comprises an line-voltage-dependent electronic trigger system. It is known that the line-voltage-dependent electronic trigger system is activated once the supply voltage exceeds a predetermined threshold value. The disadvantageous aspect in such differential-current switches is that defective line-voltage-dependent electronic trigger systems are "activated" when the conditions concerning the supply voltage are fulfilled, though which such a differential-current switch does not fulfill the intended protective function.

By using analog-to-digital converters of a higher resolution (analog-to-digital converters with a resolution of at least 20 bits or, even better, 24 bits would be required here), a resolution of the differential current signal would be possible even in the case of a very large differential currents, e.g. in the magnitude of some ten to 100 amperes. However, this represents a very costly and uneconomical solution because in addition to the very costly high-resolution analog-to-digital converters the further components of the digital signal processing would have to be adapted to the high data rates as a result of the resolution, through which costs would rise even further.

It would therefore be desirable and advantageous to address prior art shortcomings and to provide a differential-current switch, with which a favorable resolution of a differential current signal over a wide dynamic range can be achieved by substantially avoiding overdriving, which increases the readiness and security of differential-current switches with line-voltage-dependent electronic trigger systems, and which offers low component costs.

SUMMARY OF THE INVENTION

According to one aspect of the present invention, a differential-current switch includes a first unit arranged in an electric power supply network for detecting a differential current and outputting an analog differential current signal, an analog-to-digital converter receiving the outputted analog differential current signal and converting the outputted analog differential current signal to a digital differential current signal, a first digital signal processing unit receiving the digital differential current signal, a second unit for disconnecting break contacts in the electric power supply network, and first means connected upstream of the analog-to-digital converter for adjusting the analog differential current signal.

According to another aspect of the invention, a differential-current switch includes a first unit arranged in an electric power supply network for detecting a differential current and outputting an analog differential current signal, a line-voltage-independent electronic trigger system having first inputs connected to the first unit, a line-voltage-dependent electronic trigger system having second inputs connected to the first unit, and control means configured to dampen an effect of the line-voltage-independent electronic trigger system if the line-voltage-dependent electronic trigger system operates in a predetermined manner.

A differential current signal can thus be recorded over a large dynamic range and can be detected with the respectively required resolution, with only low-cost components being required, which thus enables keeping the costs for such a differential-current switch at a low level. The precision of detecting a differential current can thus be increased considerably, through which the quality of a subsequent digital signal analysis can be improved considerably. As a result of the improved recording of the differential current signal, spurious triggering of the differential-current switch can be better avoided, the service life of machines can be increased and the hazards for living beings can be reduced even further.

The readiness and security of differential-current switches with line-voltage-dependent electronic trigger systems can thus be increased. It can be ensured that line-voltage-dependent functions are only activated with actually functioning line-voltage-dependent electronic trigger systems. It can further be ensured that an additional line-voltage-independent electronic trigger system will be deactivated or dampened only with an actually functioning line-voltage-dependent electronic trigger system. It is thus ensured that the basic functions of the line-voltage-independent differential-current switches are also maintained in the case of a defective line-voltage-dependent electronic trigger system and the differential-current switch at least offers the minimum amount of protection which is predetermined by the standards.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
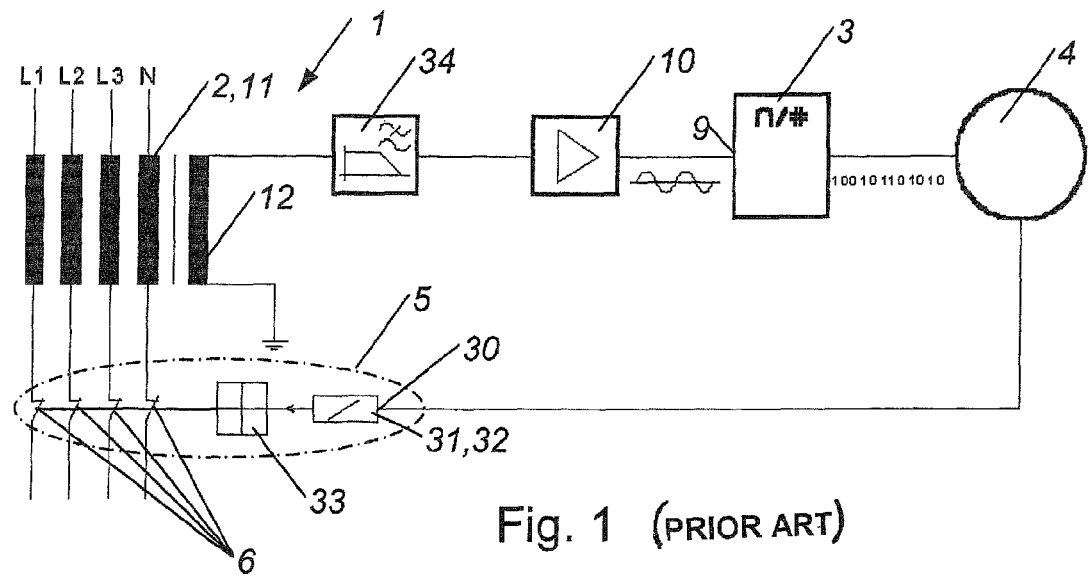
FIG. 1 shows a conventional differential-current switch.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIG. 1 shows an exemplary conventional differential-current switch 1. Conventional configurations of differential-current switches 1 with digital signal analysis are particularly used in industrial plants due to their high costs. The increased use of switching power supplies and phase angle controls in domestic areas leads to increasingly frequent occurrence of high-frequency disturbances in the power supply network of such a domestic area.

Figure 4:
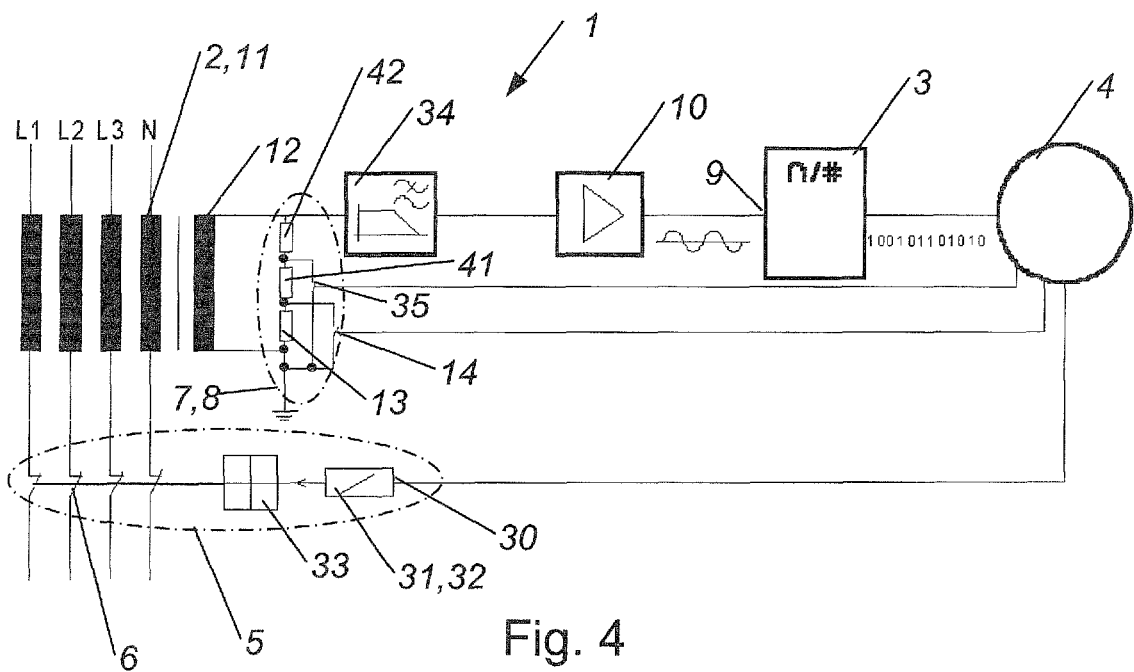
FIG. 4 shows a differential-current switch in accordance with a second embodiment of the invention.
Figure 5:
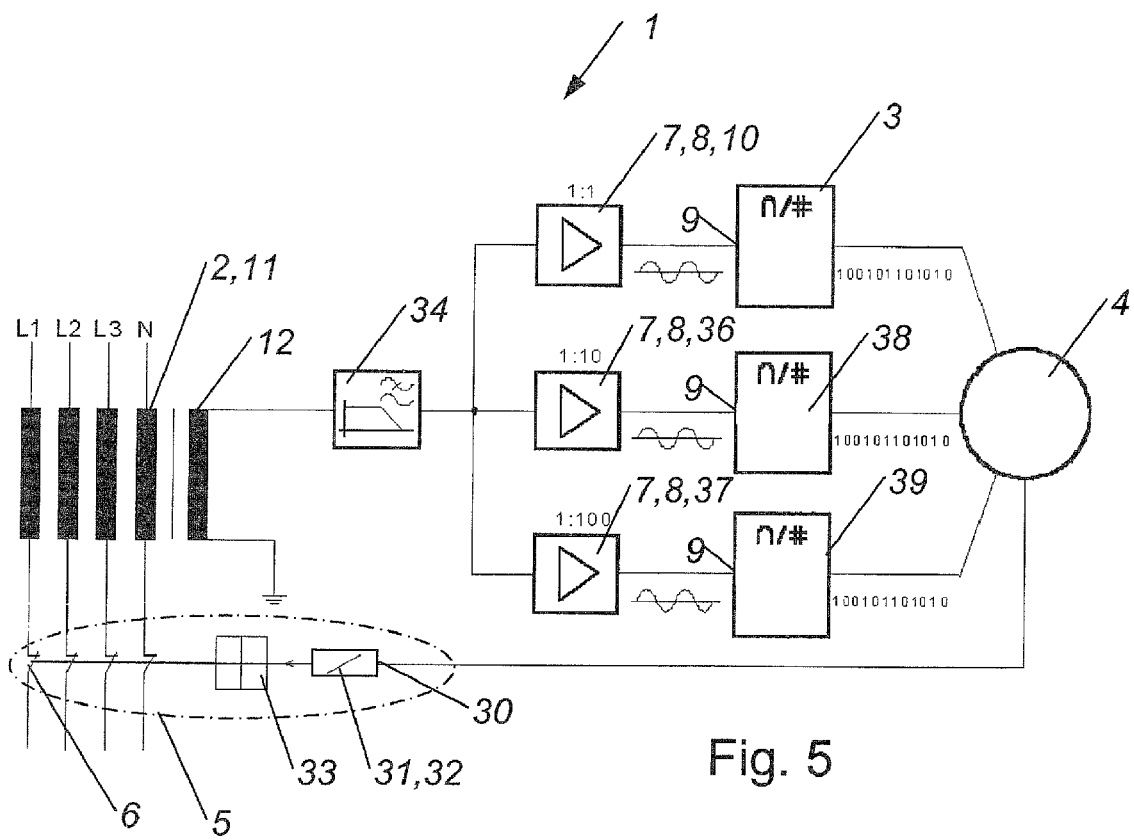
FIG. 5 shows a differential-current switch in accordance with a third embodiment of the invention.

The differential-current switch 1 includes a first unit 2 for detecting a differential current within an electric power supply network and for outputting an analog differential current signal, which first unit 2 is arranged as a sum-current transformer 11 with a secondary winding 12. It can also be provided that the first unit 2 is arranged by means of Hall generators, shunt resistors or Förster probes or includes such components, which also applies to the exemplary embodiments of the present invention described below. The differential current signal which is generated and output by the first unit 2 is converted by means of an analog-to-digital converter 3 from the analog, value- and time-continuous form into digital, value and time-discrete form. In order to illustrate this fact, FIGS. 1, 4 and 5 show a sine wave each before the analog-to-digital converter 3 and after the analog-to-digital converter 3 a sequence of "0" and "1" is shown by way of example, which shall not represent any limitation to sinusoidal analog differential current signals. The analog differential current signal preferably passes through a low-pass filter 34 before the analog-to-digital converter 3, which filter is also known as an anti-aliasing filter, and optionally a first signal processing unit 10 as shown, in which the analog differential current signal is optionally amplified.

Advantageously, the technique of oversampling is applied in the analog-to-digital converter, with the analog differential current signal being scanned or digitized with a higher time resolution than is processed in the first digital signal processing unit 4, with averaging of a predetermined number of samples occurring after the scanning. This averaging can occur both in the analog-to-digital converter 3 as well as in the first digital signal processing unit 4. As a result of the oversampling, a low-pass filter 34 of lower order can be used, which is simpler in its arrangement and causes lower phase errors than a low-pass filter 34 of a higher order. The signal-to-noise ratio is thus further improved.

The digital differential current signal at the output of the analog-to-digital converter 3 is applied to an input of a first digital signal processing unit 4. A detailed analysis of the digital differential current signal is possible by means of such a first digital signal processing unit 4. In addition to properties such as the peak value or a steady component of the differential current, parameters such as a determination of the effective value which is independent of the form of signal and an evaluation of the entire signal curve in a predetermined time segment and the storage of the differential current curve can be provided. The first digital signal processing unit 4 also carries out a comparison of the digital differential current signal with predetermined threshold values.

A differential-current switch 1 further comprises break contacts 6 for disconnecting the conductors L1, L2, L3, N of a power supply network which is monitored by the first unit 2. The break contacts 6 are preferably coupled to a circuit-breaker mechanism 33 and can be opened by said circuit-breaker mechanism 33. The circuit-breaker mechanism 33 is preferably triggered by a trigger element 31 which is preferably arranged as a permanent-magnet trigger 32. At least one output of the first digital signal processing unit 4 controls the trigger element 31 according to the currently shown embodiment and can thus cause a disconnection of the break contacts 6 when required.

The wiring of the modules schematically shown in FIG. 1 can be summarized as follows: The conductors L1, L2, L3, N pass through the sum-current transformer of a power supply network. The secondary winding 12 of the sum-current transformer 11 is connected by circuitry with an input of the low-pass filter 34 whose output is connected by circuitry to the input of the first digital signal processing unit 10. The output of the first digital signal processing unit is connected by way of circuitry to the input 9 of the analog-to-digital converter 3 whose output is connected by circuitry to an input of the first digital signal processing unit 4. One output of the first digital signal processing unit 4 is connected by circuitry to the permanent magnet trigger 32 which acts mechanically on the breaker mechanism 33 which on its part acts mechanically on the break contacts 6.

Figure 3:
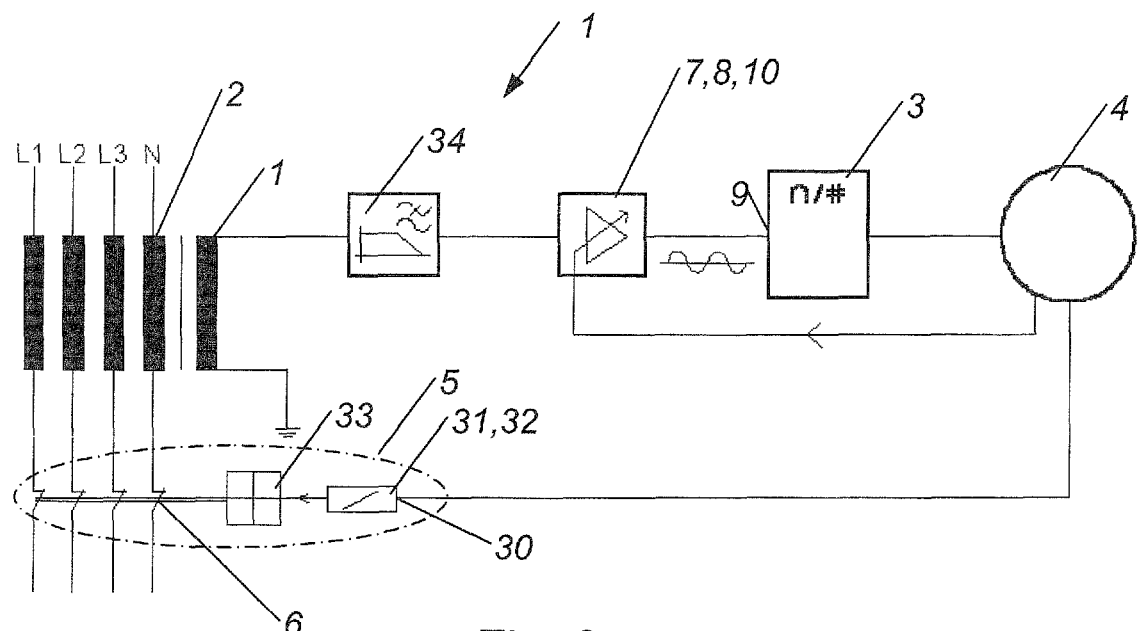
FIG. 3 shows a differential-current switch in accordance with a first embodiment of the invention.

Turning now to the other drawings, in particular FIGS. 3 to 5, there is shown a differential-current switch 1 with a first unit 2 which is arranged for detecting a differential current within an electric power supply network and for outputting an analog differential current signal, an analog-to-digital converter 3 for converting the analog differential current signal into a digital differential current signal, a first digital signal processing unit 4, and a second unit 5 for disconnecting break contacts 6 in a predetermined manner in the electric power supply network, with the differential-current switch 1 comprising first means 7 for adjusting the analog differential current signal to the analog-to-digital converter 3.

As a result, a differential current signal can be detected over a wide dynamic range and can be detected with the respectively necessary resolution. Merely low-cost components are required and the costs for such a differential-current switch 1 can be kept low. This enables a considerable increase in the precision in detecting a differential current, so that the quality of a subsequent signal analysis can be improved considerably. As a result of the improved recording of the differential current signal, spurious triggering of the differential-current switch 1 can be avoided to a much higher extent, the service life of machines can be increased and the hazards for living beings can further be reduced.

FIGS. 3 to 5 show three advantageous exemplary embodiments of a differential-current switch 1 which is similar to the differential-current switch 1 depicted in FIG. 1. All three exemplary embodiments have in common that they comprise first means 7 for adjusting the analog differential current signal to the analog-to-digital converter 3. As already explained above, a differential current signal can have a dynamic range in excess of 110 dB concerning its required resolution and the expected drive range, which would thus require an analog-to-digital converter 3 with a resolution capability of 20 bits and more. It has been observed however that it is sufficient in practice to resolve only a certain section of this large dynamic range in a favorable way. The first means 7 for adjusting the analog differential current signal to the analog-to-digital converter 3 are preferably arranged in such a way that they adjust the analog differential current signal depending on the properties of the digital differential current signal to the used analog-to-digital converter 3, which merely has a resolution of 10 bits or 12 bits according to a preferred embodiment, in such a way that the momentarily applied analog differential current signal is resolved particularly well by the analog-to-digital converter 3, such that the momentarily prevailing or current dynamic range of the analog differential current signal is adjusted to the resolution range of the analog-to-digital converter 3. It is preferably provided for this purpose that the first means 7 are controlled by the first digital signal processing unit 4.

According to an embodiment of the present invention described below, the first means 7 may be arranged as second means 8 for amplifying or attenuating the analog differential current signal.

FIG. 3 shows a first embodiment of a differential-current switch 1 in accordance with the invention in which it is provided that the at least one first digital signal processing unit 10 comprises an electronic amplification system with predetermined changeable amplification, with the term amplification according to the present application not being limited to the actual amplification in the sense of increasing, but also including the attenuation of a signal, which is a negative amplification. Each respective circuit for amplification or attenuation can be provided for amplifying or attenuating an analog electric signal. The circuit configuration corresponds substantially to the circuit configuration of the differential-current switch 1 according to FIG. 1, with the at least one first digital signal processing unit 10 being controlled for predetermining the amplification from the first digital signal processing unit 4, and therefore a further output of the first digital signal processing unit 4 is connected with an input of the first digital signal processing unit 10 by means of circuitry. As a result, the dynamic range of the analog differential current signal that actually occurs temporally can be adjusted to the value range or resolution of the analog-to-digital converter 3. The precision in small differential currents can thus be increased and overdriving can be prevented at the same time in very large differential currents. As a result, even very large differential currents can be recorded in a manner true to the signal form, through which the search for errors can be simplified considerably. By controlling the amplification, a very exact adjustment of the analog differential current signal, which is preferably continuous, to the analog-to-digital converter 3 can occur.

According to a second embodiment of a differential-current switch in accordance with the invention, at least one first resistor 13 is connected in parallel with the secondary winding 12 and at least one first switch 14 which is controlled by the first digital signal processing unit 4 is arranged for bridging or switching off the at least one first resistor 13. FIG. 4 shows a preferred arrangement of such a second embodiment, wherein, based on a differential-current switch according to FIG. 1, a serial chain is switched of a first resistor 13, a second resistor 41 and a third resistor 42 parallel to the secondary winding 12. Such first, second and third resistors 13, 41, 42 are also known as burden or burden resistors. Resistors different from the first, second and/or third resistors 13, 41, 42 can each be switched in parallel to the secondary winding 12 by means of the first or a further third switch 13, 14 which are each arranged or switched for bridging one or several of the first, second and/or third resistors 13, 41, 42 and which can each be controlled, and therefore actuated, by an output of the first digital signal processing unit 4. These measures too allow adjusting the actually temporally occurring dynamic range of the analog differential current signal in a step-by-step manner to the value range or resolution of the analog-to-digital converter 3, with the described second embodiment being very simple to implement and having very low component costs. The precision in small differential currents can thus be increased and overdriving can be prevented at the same time in very large differential currents. As a result, even very large differential currents can be recorded in a manner true to the signal form, through which the search for errors can be simplified considerably.

FIG. 5 shows a third embodiment of a differential-current switch 1 in accordance with the invention, in which, similar to the differential-current switch 1 depicted in FIG. 1, a second signal processing unit 36 and a third signal processing unit 37 are provided in addition to the first signal processing unit 10, which each are switched in parallel with respect to each other, with the first, second and third signal processing unit 10, 36, 37 each comprising an electronic amplification system with predetermined amplification. In the embodiment according to FIG. 5, the first signal processing unit 10 has an amplification factor of 1:1, the second signal processing unit 36 an amplification factor of 1:10 and the third signal processing unit 37 an amplification factor of 1:100. A first, second and third analog-to-digital converter 3, 38, 39 is switched successively to first, second and third signal processing unit 10, 36, 37, so that each signal processing unit 10, 36, 37 is connected to an analog-to-digital converter 3, 38, 39 in outgoing circuit. It is also possible to provide a lower or larger number of signal processing units 10, 36, 37 and analog-to-digital converters 3, 38, 39. Each of the three analog-to-digital converters 3, 38, 39 (according to the present third embodiment) supplies a digital differential current signal (different for each one) to a separate input of the first digital signal processing unit 4, with a multiplexing unit being provided which is controlled by the first digital signal processing unit 4 and with which several analog-to-digital converters 3, 38, 39 can be switched to merely one input of the first digital signal processing unit 4. These measures too allow adjusting the actually temporally occurring dynamic range of the analog differential current signal in a step-by-step manner to the value range or resolution of the analog-to-digital converters 3, 38, 39, with the described third embodiment having a component redundancy, due to the several provided analog-to-digital converters 3, 38, 39. The precision in small differential currents can thus be increased and overdriving can be prevented at the same time in very large differential currents. As a result, even very large differential currents can be recorded in a manner true to the signal form, through which the search for errors can be simplified considerably.

Figure 2:
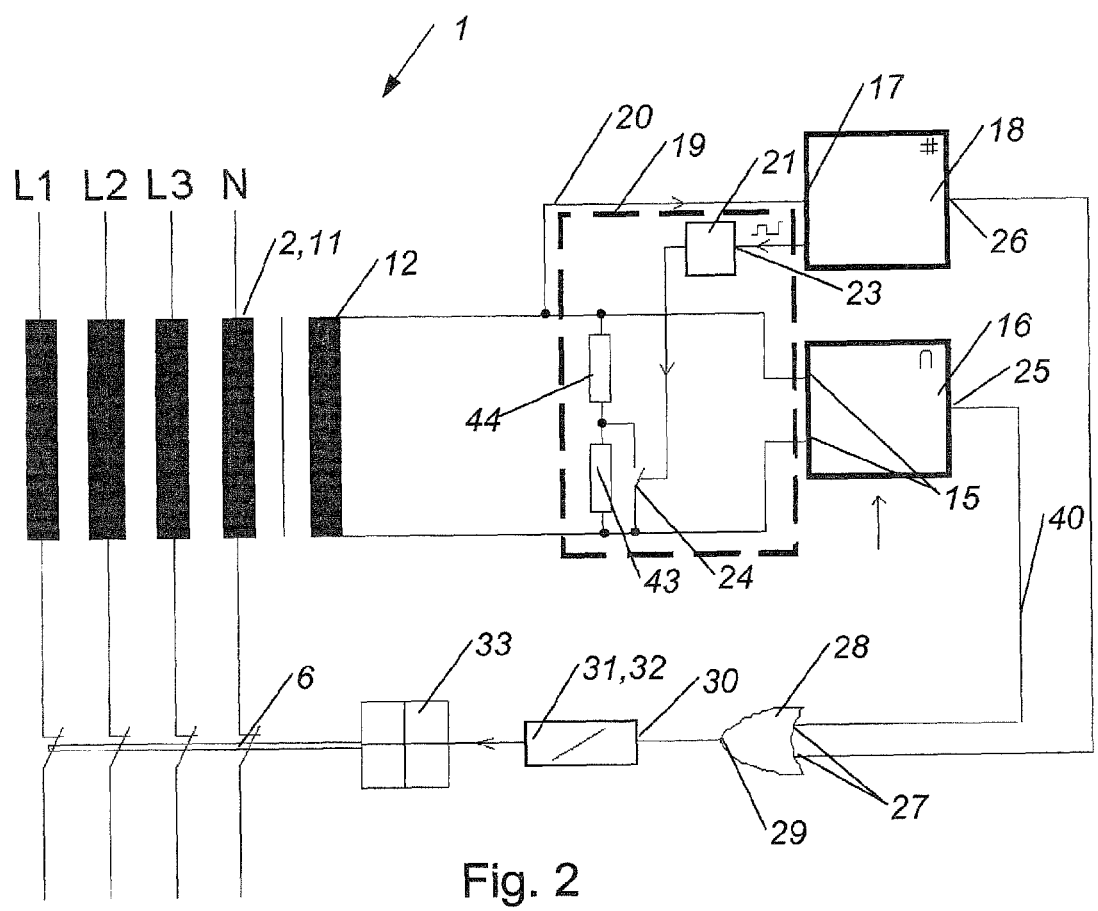
FIG. 2 shows a differential-current switch in accordance with a fourth embodiment of the invention.

FIG. 2 shows another exemplary embodiment of a differential-current switch 1, with a first unit 2 which is arranged to detect a differential current within an electric power supply network and for outputting an analog differential current signal, the first unit 2 being connected by circuitry with the first inputs 15 of an electronic trigger system 16 independent on line voltage and with the second inputs 17 of an electronic trigger system 18 dependent on line voltage, with the differential-current switch 1 comprising control means 19 which are arranged for damping the effect of the electronic trigger system 16 independent on line voltage in the case of an electronic trigger system 18 dependent on line voltage which works as predetermined.

The readiness and security of differential-current switches 1 with electronic trigger systems 18 dependent on line voltage can thus be increased. It can be ensured that functions dependent on line voltage are only activated with an actually functioning electronic trigger system 18 dependent on line voltage. It can thus further be ensured that a further existing electronic trigger system 16 independent on line voltage will be deactivated or dampened only with an actually functioning electronic trigger system 18 dependent on line voltage. It is thus ensured that the basic functions of the differential-current switch 1 which are independent on line voltage are also maintained in the case of a defective electronic trigger system 18 dependent on line voltage and the differential-current switch 1 at least offers the minimum amount of protection which is predetermined by the standards.

Such a differential-current switch 1 includes at least one line-voltage-independent electronic trigger system 16 and at least one line-voltage-dependent electronic trigger system 18 which are both arranged to trigger the differential-current switch 1 and therefore cause the disconnection or opening of the break contacts 6. The differential-current switch 1 comprises a first unit 2 according to the already described preferred embodiments which generates an analog differential current signal which is applied both to the first inputs 15 of the electronic trigger system 16 independent on line voltage as well as the second inputs 17 of an electronic trigger system 18 dependent on line voltage.

The line-voltage-independent electronic trigger system 16 is preferably arranged according to the known embodiments of line-voltage-independent electronic trigger systems 16 and preferably includes an energy storage/delay circuit in which a capacitor is charged by the analog differential current signal, with a threshold value switch being actuated upon reaching a predetermined charging state of the capacitor which activates a first trigger output 25. A discharge resistor can be connected, for example, in parallel with the capacitor.

The line-voltage-dependent electronic trigger system 18 is advantageously arranged as a digital line-voltage-dependent electronic trigger system 18, and may employ different embodiments of a line-voltage-dependent digital electronic trigger system 18 described above. When the line-voltage-dependent digital electronic trigger system 18 recognizes an error which requires opening of the break contacts 6, it activates a second trigger output 26. The term "activate" shall be understood as being a predetermined change of the state of the first or second trigger output 25, 26 within the terminology of information transmission.

As already explained, both the line-voltage-independent electronic trigger system 16 and the line-voltage-dependent electronic trigger system 18 are provided for triggering the differential-current switch 1. In one embodiment, with the differential-current switch 1 shown schematically in FIG. 2, a first trigger output of the line-voltage-independent electronic trigger system 16 and a second trigger output 26 of the line-voltage-dependent electronic trigger system 18 are connected with the third inputs 27 of a logic OR element 28, with an output 29 of the logic OR element 28 being connected with the fourth input 30 of the trigger element 31 which is advantageously arranged as a permanent magnet trigger 32. The output of the trigger element 31 is connected in a manner explained above with the circuit-breaker mechanism 33 which acts mechanically on the break contacts 6. It can thus be ensured that the differential-current switch 1 will trigger, the break contacts 6 are therefore opened as long as one of the two electronic trigger systems 16, 18 detects a differential current.

The differential-current switch 1 includes control means 19 which are arranged for damping the effect of the line-voltage-independent electronic trigger system 16 with a line-voltage-dependent electronic trigger system 18 that operates in an intended manner. The control means 19 preferably include the entirety of the means or modules required for achieving this damping of the effect of the electronic trigger system 16 independent on line voltage and is illustrated in the embodiment according to FIG. 2 by the rectangular shown with the broken line in bold print. Damping of the effect of the line-voltage-independent electronic trigger system 16 shall mean in this context that the line-voltage-independent electronic trigger system 16 has no effect, or only a small effect, on the downstream modules, for example, on the trigger element compared to a situation without damping. The influence of the line-voltage-independent electronic trigger system 16 on the downstream modules can be limited or eliminated completely. Several different types of damping of this effect of the line-voltage-independent electronic trigger system 16 are advantageously provided.

According to a first arrangement of the damping of this effect of the line-voltage-independent electronic trigger system 16, the control means 19 may be arranged for predetermined damping, particularly interrupting, the signal transmission within the line-voltage-independent electronic trigger system 16, such that the line-voltage-independent electronic trigger system 16 itself is dampened or is not a functional circuit, for example, by arranging a switch in the line-voltage-independent electronic trigger system 16 capable of interrupting the flow of current or signals.

According to a second arrangement of the damping of this effect of the electronic trigger system 16 independent on line voltage, the control means 19 may be arranged for predetermined damping of the signal transmission from a first trigger output 25 of the line-voltage-independent electronic trigger system 16 to a fourth input 30 of a trigger element 31, particularly for predetermined damping, preferably interruption, of a second circuit connection 40 between the first trigger output 25 and the fourth input 30.

As is shown in FIG. 2, according to a third arrangement of the damping of this effect of the line-voltage-independent electronic trigger system 16, the control means 19 may be arranged for predetermined damping of the signal transmission from the first unit 2 to at least one of the first inputs 15, particularly for predetermined damping, preferably interruption, of a first circuit connection 20 between the first unit 2 and at least one of the first inputs 15. According to FIG. 2, a fourth and fifth serially connected resistor 43, 44 are connected in parallel with the secondary winding 12 of the sum-current transformer 11, wherein at least one of the fourth and fifth resistors 43, 44 can be bridged by a second switch 24.

The control means 19 may advantageously include at least one electronic control system 21 which is triggered by the line-voltage-dependent electronic trigger system 18 and which is preferably arranged to trigger a second switch 24 when a control signal which changes in a predetermined, controlled manner is applied to the control input 23. The line-voltage-dependent electronic trigger system 18 may here include a second digital signal processing unit configured to output a predetermined, changing control signal to a control input 23 of the electronic control system 21. Advantageously, the second digital signal processing unit may include a processor, such as a microprocessor, microcontroller and/or a digital signal processor. With digital processing of a differential current signal in a differential-current switch 1 in a line-voltage-dependent electronic trigger system 18, the first and second digital signal processing unit 4 may be arranged as one unit, so that the components for digital signal processing such as processor, memory, data bus and the like need to be provided only once.

As already explained, the second digital signal processing unit is arranged to output a predetermined, changing control signal to a control input 23 of the electronic control system 21. According to one embodiment, the second digital signal processing unit includes a processor which performs the signal analysis of the digital differential current signal, with the second digital signal processing unit additionally generating and outputting the predetermined, changing control signal. This predetermined, changing control signal will only be generated when the second digital signal processing unit operates properly in a predetermined manner. This can easily be achieved by respective programming of the processor. Advantageously, in addition to the other work routines, a predetermined, periodic rectangular signal is outputted as a control signal, for example, to the control input 23 of the electronic control system 21, as is also indicated in FIG. 1. Other types of control signals may be generated and outputted. It is thus achieved for the first time that not only the presence of the supply voltage or the components is checked in a differential-current switch 1 with a line-voltage-dependent electronic trigger system 18, but actually the correct and predetermined function of the modules required for line-voltage-dependent triggering. It can thus be ensured that such a differential-current switch 1 will operate as a fully line-voltage-independent differential-current switch 1 even with a non-functioning line-voltage-dependent electronic trigger system 18. Standards are thus also fully fulfilled which are not permitted by line-voltage-dependent differential-current switches 1.

Figure 6:
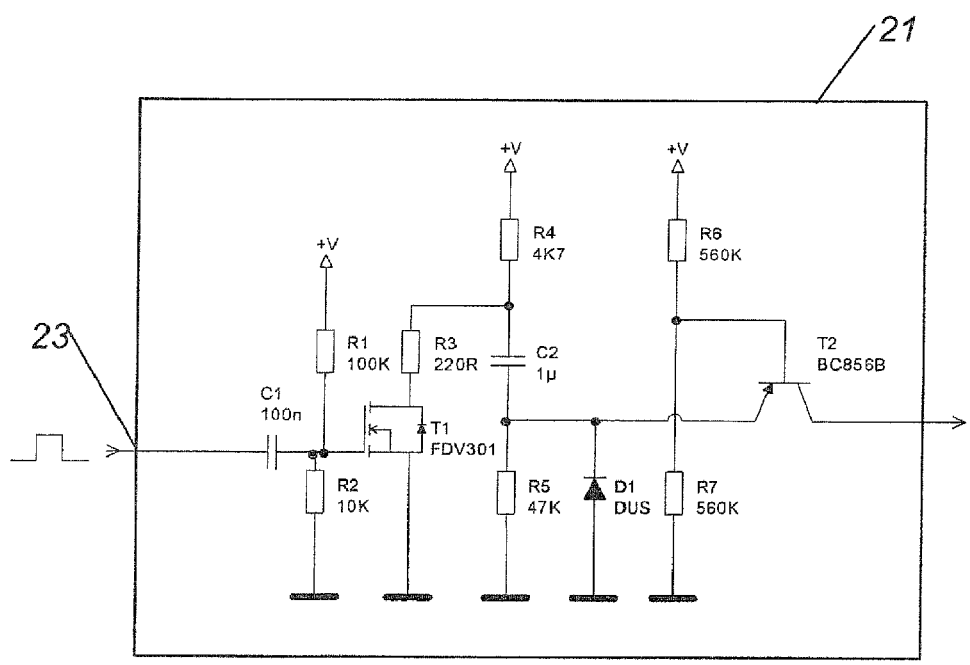
FIG. 6 shows a preferred embodiment of control electronics.

A respective electronic control system 21 is required for the respective function of the control means 19, which system will activate an output only when the respectively predetermined control signal is applied to its control input 23. FIG. 6 shows a particularly preferred arrangement of an electronic control system 21 for a periodic rectangular control signal, with the international conventional switching systems and dimension data being used for the illustration.

The core of the circuit is the RC-element, formed by R4+R5 and C2. At the time of activation, when C2 is discharged, approximately 90% of the supply voltage+V are applied to R5, as a result of the voltage division between R4 and R5. With the charging of C2 the voltage applied to R5 begins to sink.

It is the task of the FET T1 to discharge the capacitor C2 via the resistor R3 and the diode D1. The gate voltage is set to a value by the voltage divider R1/R2 which is slightly beneath the value of the control voltage at which the FET becomes conductive, with scattering being taken into account. By applying a rectangular control signal to control input 23 which is guided via the capacitor C1 to the gate, the gate can be controlled in an impulse-like way, so that the FET will regularly discharge the capacitor C2. It is thus ensured that a rectangular control signal must be applied to the control input 23 in order to switch the output to active. A static DC voltage is not enough. A base voltage is determined via the voltage divider R6/R7 which is used as a reference. If the voltage to R5 falls beneath this value (on the basis of the emitter voltage), T2 will become high-resistance, from which it follows that the output is deactivated. The output remains deactivated if a component is missing, if there is a bad soldering point or a similar fault.

The circuitry of the modules which are merely schematically shown in FIG. 2 is summarized as follows: The conductors L1, L2, L3, N of a power supply network pass through the sum-current transformer 11. The secondary winding 12 of the sum-current transformer 11 is connected by circuitry both with the first inputs 15 of the electronic trigger system 16 independent on line voltage and with the second inputs 17 of the electronic trigger system 18 dependent on line voltage. The fourth and fifth resistors 43, 44 which are switched in series with respect to each other are switched parallel to the secondary winding 12 before the first inputs 15, but after the supply of the second inputs 17, with a second switch 24 being arranged by circuitry for the possible bridging of one of these resistors 43, 44. The second switch 24 is triggered by the electronic control system and is connected with the same by circuitry measures. One control input 23 of the electronic control system 21 is connected by circuitry with one output of the electronic trigger system 18 dependent on line voltage. The first trigger output 25 of the electronic trigger system 16 independent on line voltage and the second trigger output 26 of the electronic trigger system 18 dependent on line voltage are each connected with the third inputs 27 of a logic OR element 28 whose output 29 is connected by means of circuitry with the permanent magnet trigger 32 which acts mechanically on the circuit-breaker mechanism 33, which on its part acts mechanically on the breaker contacts 6.

Additional embodiments in accordance with the invention may only include parts of the described features. Any possible combination of features may be provided, particularly also of different described embodiments.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:
1. A differential-current switch, comprising:
 a first unit arranged in an electric power supply network for detecting a differential current and outputting an analog differential current signal,
 a first analog-to-digital converter receiving the outputted analog differential current signal and converting the outputted analog differential current signal to a digital differential current signal,
 a first digital signal processing unit receiving the digital differential current signal,
 a second unit for disconnecting break contacts in the electric power supply network,
 at least one first digital signal processing unit connected upstream of an input of the first analog-to-digital converter and comprising an electronic amplification system with a predetermined first amplification factor, and
 at least one second digital signal processing unit arranged in parallel with the first digital signal processing unit and connected upstream of an input of a second analog-to-digital converter and having a predetermined second amplification factor different from the predetermined first amplification factor for adjusting the analog differential current signal.

2. The differential-current switch of claim 1, wherein the at least one second digital signal processing unit is controlled by the first digital signal processing unit.

3. The differential-current switch of claim 1, wherein the at least one second digital signal processing unit adjusts the analog differential current signal through amplification or attenuation.

4. The differential-current switch of claim 1, wherein the first unit comprises:
    a sum-current transformer with a secondary winding,
    at least one first resistor connected in parallel with the secondary winding, and
    at least one first switch which is controlled by the first digital signal processing unit and bridges or deactivates the at least one first resistor.

5. A differential-current switch, comprising:
    a first unit arranged in an electric power supply network for detecting a differential current and outputting an analog differential current signal,
    a line-voltage-independent electronic trigger system having first inputs connected to the first unit,
    a line-voltage-dependent electronic trigger system having second inputs connected to the first unit, and
    control means configured to dampen an effect of the line-voltage-independent electronic trigger system when the line-voltage-dependent electronic trigger system operates in a predetermined manner,
    wherein the line-voltage-dependent electronic trigger system is configured to output a control signal to a control input of an electronic control system, which control signal changes in a predetermined manner.

6. The differential-current switch of claim 5, wherein the control means are configured to at least one of dampen and interrupt signal transmission from the first unit to at least one of the first inputs.

7. The differential-current switch of claim 5, wherein the control means are configured to at least one of dampen and interrupt signal transmission within the line-voltage-independent electronic trigger system.

8. The differential-current switch of claim 5, wherein the control means are configured to at least one of dampen and interrupt signal transmission from a first trigger output of the line-voltage-independent electronic trigger system to a fourth input of a trigger element.

9. The differential-current switch of claim 5, wherein the control means comprise at least one electronic control system which is controlled by the line-voltage-dependent electronic trigger system.

10. The differential-current switch of claim 9, wherein the line-voltage-dependent electronic trigger system is configured to output a control signal to a control input of the electronic control system, which control signal changes in a predetermined manner.

11. The differential-current switch of claim 10, wherein the electronic control system is configured to control a switch, with the control signal being applied to the control input.

12. The differential-current switch of claim 8, wherein the line-voltage-independent electronic trigger system has a first trigger output and the line-voltage-dependent electronic trigger system has a second trigger output, with the first and second trigger outputs being connected to third inputs of a logic OR element, and wherein an output of the logic OR element is connected to the fourth input of the trigger element.

13. The differential-current switch of claim 12, wherein the trigger element is configured as a permanent magnet trigger.

14. A differential-current switch, comprising:
    a first unit arranged in an electric power supply network for detecting a differential current and outputting an analog differential current signal,
    a line-voltage-independent electronic trigger system having first inputs connected to the first unit and a first trigger output,
    a line-voltage-dependent electronic trigger system having second inputs connected to the first unit and a second trigger output, and
    control means configured to dampen an effect of the line-voltage-independent electronic trigger system by at least one of dampening and interrupting signal transmission from a first trigger output of the line-voltage-independent electronic trigger system to a fourth input of a trigger element when the line-voltage-dependent electronic trigger system operates in a predetermined manner,
    wherein the first and second trigger outputs are connected to third inputs of a logic OR element, and wherein an output of the logic OR element is connected to the fourth input of the trigger element.

15. The differential-current switch of claim 14, wherein the trigger element is configured as a permanent magnet trigger.

* * * * *